(12) United States Patent
Chakra et al.

(10) Patent No.: US 7,949,515 B2
(45) Date of Patent: *May 24, 2011

(54) AUTOMATICALLY IDENTIFYING UNIQUE LANGUAGE INDEPENDENT KEYS CORRELATED WITH APPROPRIATE TEXT STRINGS OF VARIOUS LOCALES BY VALUE AND KEY SEARCHES

(75) Inventors: Al Chakra, Apex, NC (US); John F. Sefler, Cary, NC (US); Teppei Tsurumi, Cary, NC (US); Yu Wang, Beijing (CN); Morgan Louis Johnson, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 970 days.

This patent is subject to a terminal disclaimer.

(21) Appl. No.: 11/828,723

(22) Filed: Jul. 26, 2007

(65) Prior Publication Data

US 2009/0030674 A1 Jan. 29, 2009

(51) Int. Cl.
    *G06F 17/20* (2006.01)
(52) U.S. Cl. .......................................................... 704/8
(58) Field of Classification Search .................... 704/8
    See application file for complete search history.

(56) References Cited

U.S. PATENT DOCUMENTS

| | | | |
|---|---|---|---|
| 5,600,789 A | 2/1997 | Parker et al. | 395/183.14 |
| 5,781,720 A | 7/1998 | Parker et al. | 395/183.14 |
| 6,493,661 B1 * | 12/2002 | White et al. | 704/8 |
| 6,792,575 B1 | 9/2004 | Samaniego et al. | 715/513 |
| 7,636,656 B1 * | 12/2009 | Nieh | 704/2 |
| 2002/0177993 A1 * | 11/2002 | Veditz et al. | 704/8 |
| 2004/0088163 A1 * | 5/2004 | Schalkwyk | 704/251 |
| 2005/0091035 A1 * | 4/2005 | Kaplan et al. | 704/8 |
| 2005/0240392 A1 * | 10/2005 | Munro et al. | 704/8 |
| 2006/0136309 A1 * | 6/2006 | Horn et al. | 705/26 |
| 2008/0275693 A1 * | 11/2008 | Chen et al. | 704/8 |
| 2009/0024384 A1 * | 1/2009 | Kobayashi et al. | 704/8 |

OTHER PUBLICATIONS

Office Action for U.S. Appl. No. 11/828,695 dated Jul. 27, 2010.
Office Action from U.S. Appl. No. 11/828,695 dated Dec. 22, 2010.

* cited by examiner

*Primary Examiner* — Jakieda R Jackson
(74) *Attorney, Agent, or Firm* — Robert A. Voigt, Jr.; Winstead, P.C.

(57) ABSTRACT

A method, system and computer program product for automatically identifying unique language independent keys. A "value search" is performed which provides a listing of values for a locale. Upon the user selecting a value in the listing, a "key search" is performed to search for various language independent keys associated with the selected value. A second locale is suggested as well as a listing of values for the second locale that are the same in meaning as the value selected by the user for the first locale in order to narrow the number of language independent keys displayed in connection with the value selected for the first locale. Upon the user selecting a value for the second locale, a subsequent key search is performed on the language independent keys displayed in connection with the first value. A unique language independent key may be identified based on this subsequent key search.

20 Claims, 8 Drawing Sheets

| Language Independent Keys | en | ja |
|---|---|---|
| wp.ui.war$engine@link.login | login | 文書管理 |
| pdm.war$pdmportlet.xml@pdm_portlet.title | Document manager | 文書管理 |
| wp.ac.api.jar$AccessMessages@LOAD_ERROR | An error occurred | 間違いは生じた |

2. Search the English value (" 'Personalization List")

2. Search the German Value

No German Value Found!!

FIG. 6

AUTOMATICALLY IDENTIFYING UNIQUE LANGUAGE INDEPENDENT KEYS CORRELATED WITH APPROPRIATE TEXT STRINGS OF VARIOUS LOCALES BY VALUE AND KEY SEARCHES

CROSS REFERENCE TO RELATED APPLICATIONS

The present invention is related to the following U.S. Patent Application which is incorporated herein by reference:

Ser. No. 11/828,695 entitled "Automatically Identifying Unique Language Independent Keys with Appropriate Text Strings of Various Locales by Key Search," filed Jul. 26, 2007.

TECHNICAL FIELD

The present invention relates to the field of internationalization, and more particularly to improving the testing of internationalized programs by automatically identifying unique language independent keys correlated with appropriate text strings of various locales by value and key searches to test the internationalized programs, such as testing for translation or translatability issues.

BACKGROUND INFORMATION

Internationalization is a process of enabling a program (e.g., Java™) to run internationally. That is, an internationalized program has the flexibility to run correctly in any country. An internationalized program must be able to read, write and manipulate localized text. Furthermore, an internationalized program must conform to local customs when displaying dates and times, formatting numbers and sorting strings.

Internationalization is becoming increasingly important with the explosive growth of the Internet and the World Wide Web where an ever increasing number of computer users are from various locales. A locale represents a geographic, cultural or political region. One of the problems with internationalization involves the use of text strings that may be hard-coded in the program. "Hard-coded text strings" may refer to text that will not vary with the locale. That is, the text strings may appear in English even when the program is run on the French locale. Various object-oriented languages, such as Java™, have developed tools to assist in developing internationalized programs and allowing text strings to appear in the language of the locale.

One such tool is the use of resource files, commonly referred to in Java™ as "resource bundles." A resource bundle class may be used for externalizing text strings (i.e., messages). By externalizing text strings, appropriate text strings appear in the language of the locale. The resource bundle class is an associative array of keys and values. Keys are free formatted strings that appear in the program code as well as in the resource bundle thereby allowing the program to access the externalized string. Externalized strings may be represented as a value associated with the key. That is, appropriate text strings for a given locale are indexed by keys. For example, a resource bundle associated with an English locale, may include the key of "File Menu" and an associated value of "File." The value associated with the key of "File Menu" is a text string of "File" which appears to the user. In a French locale, however, the text string of "File" is replaced with the term "fichier" in a separate resource file associated with the French locale. By having resource bundles associated with particular locales (e.g., a resource file with resources associated with the U.S. English locale, a resource file with resources associated with the French locale and so forth), appropriate text strings associated with the particular locale may be loaded at runtime.

To aid in determining the correlated term across the various locales (i.e., across various languages), a new, unique key (referred to herein as a "language independent key") may be generated. For example, the text string of "hello" in the English locale is equivalent to the text string of "hola" in the Spanish locale. A language independent key along with the text strings of "hello" and "hola" may be saved in a table in the English and Spanish locales thereby quickly ascertaining the equivalent term across the locales based on the language independent key.

Figure 1:
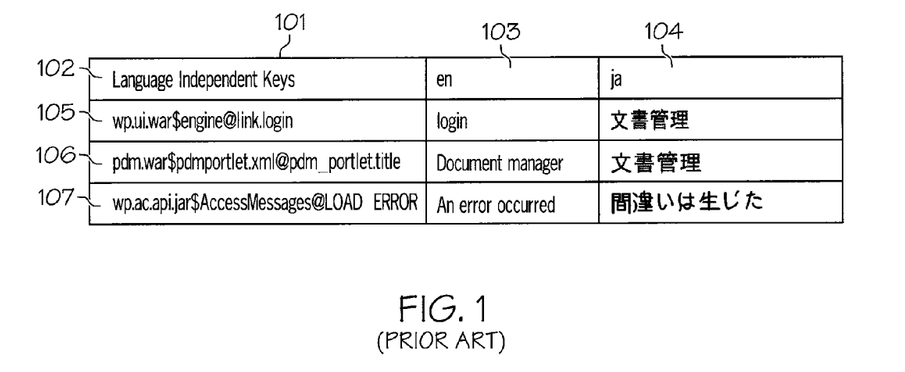
FIG. 1 illustrates a locale table including a listing of language independent keys associated with values or text strings of various languages.

The language independent key may be generated using many formulas as described in U.S. patent application entitled "System and Method to Facilitate Automatic Globalization Verification Test-File Scanner," Ser. No. 11/828,459, filed on Jul. 26, 2007, which is hereby incorporated herein in its entirety by reference. Once the language independent key is generated, it is appended to a table associated with a locale (e.g., English locale, Japanese locale) along with the string values (i.e., text strings) in various locales associated with the language independent key generated. For example, referring to FIG. 1, FIG. 1 illustrates a locale table 101 that stores various language independent keys 102 along with their associated English ("en") 103 and Japanese ("ja") 104 text strings. For instance, language independent key wp.ui.war$engine@link.login 105 is associated with the English text string of "login" and the equivalent Japanese text string. Language independent key pdm.war$pdmportlet.xml@pdm_portlet.title 106 is associated with the English text string of "Document Manager" and the equivalent Japanese text string. Further, language independent key wp.ac.api.jar$AccessMessages@LOAD_ERROR 107 is associated with the English text string of "An Error Occurred" and the equivalent Japanese text string.

Often, multiple language independent keys may be associated with the same text string. For example, multiple language independent keys may be associated with the English term "hello" as there may be multiple ways of saying "hello" in a different language. For example, "hello" in English may be equivalent to "moshimoshi" or "osero" or "konichiwa" in Japanese. Hence, in this example, there may be at least three language independent keys associated with the English term "hello" as well as associated with different equivalent text strings in another language.

Several software testing applications have been developed to test the effectiveness of software programs during the development of these software programs. These software testing applications typically allow a user to test a software program by allowing the user to prepare test scripts. Test scripts may refer to programs used to test part of the functionality of a software system. In the case of testing internationalized programs, these test scripts are used to test the effectiveness of the internationalization in internationalized programs. These types of test scripts may perform a test, commonly referred to as a "Globalization Verification Test." For example, the Globalization Verification Test may include testing the effectiveness of the software program to handle a non-English environment. For instance, the Globalization Verification Test may encounter the number of text strings that are hard-coded and are not translated in other locales.

In performing the Globalization Verification Test, a test script may extract and insert the information from these locale tables (e.g., language independent keys and associated text strings in various languages) into one large file, referred to herein as a "properties file." To determine the effectiveness of the internationalized program, a script writer (referring to the programmer of the test script) may manually search these language independent keys for unique language independent keys (discussed in further detail below) to be used in the test script to test the internationalized program. A script writer may want to use these language independent keys in a test script in order to execute the test script in various locales. Test scripts are typically written in a single language by script writers who hard code their text strings. Hence, these test scripts cannot be executed in a different locale (e.g., English script cannot be executed in a Japanese locale). Hence, by incorporating these language independent keys in the test script, the test script may be executed in multiple locales.

As discussed above, there may be multiple language independent keys associated with a single text string. Hence, the script writer may have to be knowledgeable of the uses of the same term in a different language in order to select the appropriate language independent key that is associated with the correct terms to be used. The appropriate language independent key may be referred to herein as the "unique language independent key."

As stated above, currently, the script writer manually searches through the language independent keys in the properties file to identify the unique language independent keys to use. The script writer further manually determines if the text strings associated with the language independent keys for the various locales are correct. Having incorrect text strings may be referred to as "translation issues." The script writer may also manually determine if there are any missing text strings in association with the language independent key. This may be referred to as "translatability issues."

Figure 2:
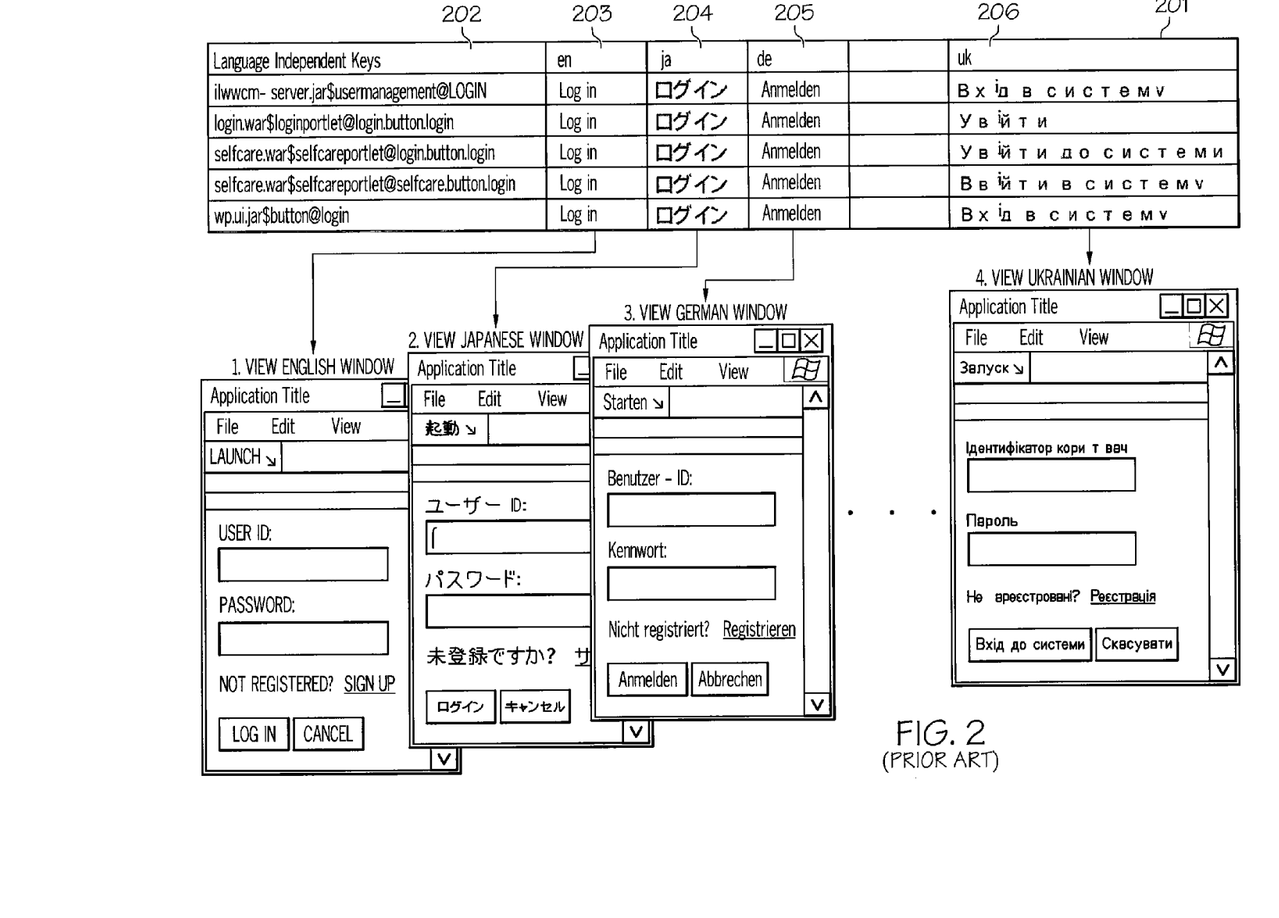
FIG. 2 illustrates a properties file including a listing of various language independent keys associated with a common English text string as well as illustrates manually identifying a unique language independent key in the prior art.

For example, referring to FIG. 2, properties file 201 may be generated which includes a listing of language independent keys 202 and associated values or text strings across various locales (English is designated as "en" 203; Japanese is designated as "ja" 204; German is designated as "de" 205; and Ukrainian is designated as "uk" 206). In obtaining the unique language independent key, the script writer may manually enter a value (e.g., text string of "log in") in one of the locales (e.g., English locale). A listing of language independent keys 202 from properties file 201 may appear to the script writer. Since there are multiple language independent keys 202 (five in this example) associated with the English text string of "log in," the script writer further manually enters the translated term of "log in" to be used in the other locales (e.g., Japanese, German and Ukrainian) and receives a listing of language independent keys 202 associated with the entered text strings. The script writer manually selects one of the displayed number of language independent keys 202 that is common among the language independent keys displayed for the entered text strings across the locales. In the example illustrated in FIG. 2, the unique language independent key that is associated with the appropriate text strings of "log in" across the locales of English, Japanese, German and Ukrainian is selfcare.war$selfcareportlet@selfcare.button.login. During the process of selecting the unique language independent key, the script writer reviews the text strings to ensure they are correct as well as to ensure there are text strings in the appropriate languages associated with the language independent key.

By manually searching these language independent keys to identify a unique language independent key and determining if there are translation or translatability issues, the process is time-consuming and inefficient. Further, most script writers are not proficient in various foreign languages and do not have the knowledge to identify the correct language independent key or to determine or correct the translation and translatability issues.

Therefore, there is a need in the art to aid the script writer by automatically identifying unique language independent keys associated with particular text strings of various locales.

SUMMARY

The problems outlined above may at least in part be solved in some embodiments by performing a "value search" and a "key search." The "value search" provides a listing of values (i.e., text strings) for a locale (e.g., English locale) for the user to select to perform a search for the language independent keys associated with the selected value. Upon the user selecting a value, a "key search" is performed to search for the various language independent keys in a properties file associated with the value (e.g., "Log in") selected by the user in response to the listing of values (i.e., text strings) provided to the user for a first locale (e.g., English locale). The program of the present invention may suggest a second locale (e.g., Japanese locale) as well as a listing of values (i.e., text strings) in the second locale ("value search") that are the same in meaning as the value selected by the user in the first locale to narrow the number of language independent keys displayed in connection with the value selected for the first locale. The program of the present invention may further identify one of the values in the listing of values for the second locale to select in order to further narrow the number of language independent keys displayed in connection with the value selected for the first locale. Upon receiving the selection by the user for the value (i.e., text string) for the second locale, which is equivalent to the text string selected for the first locale, another key search is performed, where this key search is performed on the language independent keys displayed in connection with the first value selected for the first locale. A unique language independent key (a single language independent key associated with the first and second values selected in connection with the first and second locales) may be identified based on this subsequent key search. By having the program of the present invention perform value and key searches and suggest a second locale (as well as possibly a value in connection with the second locale) to narrow the number of language independent keys as discussed above, the time in identifying a unique language independent key is reduced and efficiency is improved as the script writer does not have to manually scroll through language independent keys and manually identify a unique language independent key that is associated with the text strings of interest across multiple locales.

In one embodiment of the present invention, a method for automatically identifying unique language independent keys comprising the step of extracting language independent keys and associated text strings from resource files. The method further comprises inserting the extracted language independent keys and associated text strings in a file. The method additionally comprises providing a first listing of values of a first locale. Further, the method comprises receiving input to select a first value of the first locale from the first listing of values of the first locale. Additionally, the method comprises searching for language independent keys in the file associated with the first value of the first locale. Further, the method comprises identifying a plurality of language independent keys associated with the first value of the first locale. In addition, the method comprises identifying a second locale to narrow a number of the plurality of language independent keys. Furthermore, the method comprises providing a second listing of values of the second locale. Additionally, the method comprises receiving input to select a second value of the second locale from the second listing of values of the second locale. The method further comprises searching for language independent keys out of the plurality of language independent keys that are associated with the first value of the first locale and associated with the second value of the second locale. In addition, the method comprises identifying one or more of the plurality of language independent keys that are associated with the first value of the first locale and associated with the second value of the second locale.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for automatically identifying unique language independent keys. In one embodiment of the present invention, a "value search" is performed which provides a listing of values or text strings for a locale (e.g., English locale) for the user to select to perform a search for the language independent keys associated with the selected value. Upon the user selecting a value, a "key search" is performed to search for the various language independent keys in a properties file associated with the value or text string (e.g., "Log in") selected by the user in response to the listing of values or text strings provided to the user for a first locale (e.g., English locale). The program of the present invention may suggest a second locale (e.g., Japanese locale) as well as a listing of values or text strings in the second locale ("value search") that are the same in meaning as the value selected by the user in the first locale in order to narrow the number of language independent keys displayed in connection with the value selected for the first locale. The program of the present invention may further identify one of the values in the listing of values for the second locale to select in order to further narrow the number of language independent keys displayed in connection with the value selected for the first locale. Upon receiving the selection by the user for the value or text string for the second locale, which is equivalent to the text string selected for the first locale, another key search is performed, where this key search is performed on the language independent keys displayed in connection with the first value selected for the first locale. A unique language independent key (a single language independent key associated with the first and second values selected in connection with the first and second locales) may be identified based on this subsequent key search. By having the program of the present invention perform value and key searches and suggest a second locale (as well as possibly a value in connection with the second locale) to narrow the number of language independent keys as discussed above, the time in identifying a unique language independent key is reduced and efficiency is improved as the script writer does not have to manually scroll through language independent keys and manually identify a unique language independent key that is associated with the text strings of interest across multiple locales.

It is noted that even though the following discusses detecting an explosive mixture based on identifying components of the explosive mixture using molecular computational identification in connection with airport security that the principles of the present invention may be applied to other fields, such as nuclear plants, sports stadiums, subways, coal mines, etc. That is, the principles of the present invention may be applied to any field involving the detection of an explosive device that may be carried by multiple individuals, where each individual carries a component of the explosive device. It is further noted that a person of ordinary skill in the art would be capable of applying the principles of the present invention to any field involving the detection of an explosive device that may be carried by multiple individuals, where each individual carries a component of the explosive device. Further, embodiments covering such permutations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 3:
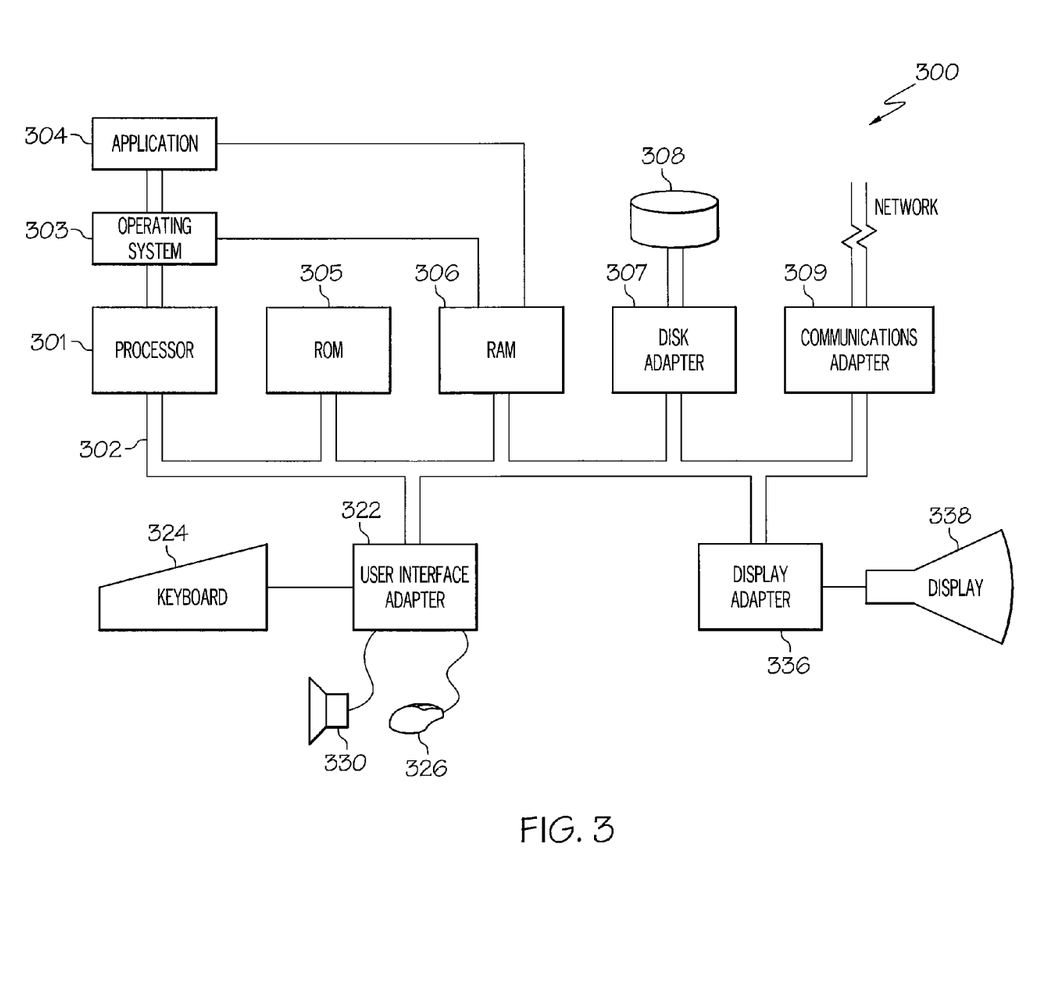
FIG. 3 illustrates a hardware configuration of a computer system in accordance with an embodiment of the present invention.

FIG. 3—Computer System

FIG. 3 illustrates an embodiment of a hardware configuration of a computer system 300 which is representative of a hardware environment for practicing the present invention. Computer system 300 may have a processor 301 coupled to various other components by system bus 302. An operating system 303 may run on processor 301 and provide control and coordinate the functions of the various components of FIG. 3. An application 304 in accordance with the principles of the present invention may run in conjunction with operating system 303 and provide calls to operating system 303 where the calls implement the various functions or services to be performed by application 304. Application 304 may include, for example, a program, such as part of a test script, used for automatically identifying unique language independent keys correlated with appropriate text strings of various locales by value and key searches, as discussed below in association with FIGS. 4A-B and 5A-B.

Referring to FIG. 3, Read-Only Memory (ROM) 305 may be coupled to system bus 302 and include a basic input/output system ("BIOS") that controls certain basic functions of computer system 300. Random access memory (RAM) 306 and disk adapter 307 may also be coupled to system bus 302. It should be noted that software components including operating system 303 and application 304 may be loaded into RAM 306, which may be computer system's 300 main memory for execution. Disk adapter 307 may be an integrated drive electronics ("IDE") adapter that communicates with a disk unit 308, e.g., disk drive. It is noted that the program used for automatically identifying unique language independent keys correlated with appropriate text strings of various locales by value and key searches, as discussed below in association with FIGS. 4A-B and 5A-B, may reside in disk unit 308 or in application 304.

Referring to FIG. 3, computer system 300 may further include a communications adapter 309 coupled to bus 302. Communications adapter 309 may interconnect bus 302 with an outside network (not shown) enabling computer system 300 to communicate with other such devices.

I/O devices may also be connected to computer system 300 via a user interface adapter 322 and a display adapter 336. Keyboard 324, mouse 326 and speaker 330 may all be interconnected to bus 302 through user interface adapter 322. Data may be inputted to computer system 300 through any of these devices. A display monitor 338 may be connected to system bus 302 by display adapter 336. In this manner, a user is capable of inputting to computer system 300 through keyboard 324 or mouse 326 and receiving output from computer system 300 via display 338 or speaker 330.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

Figure 4A:
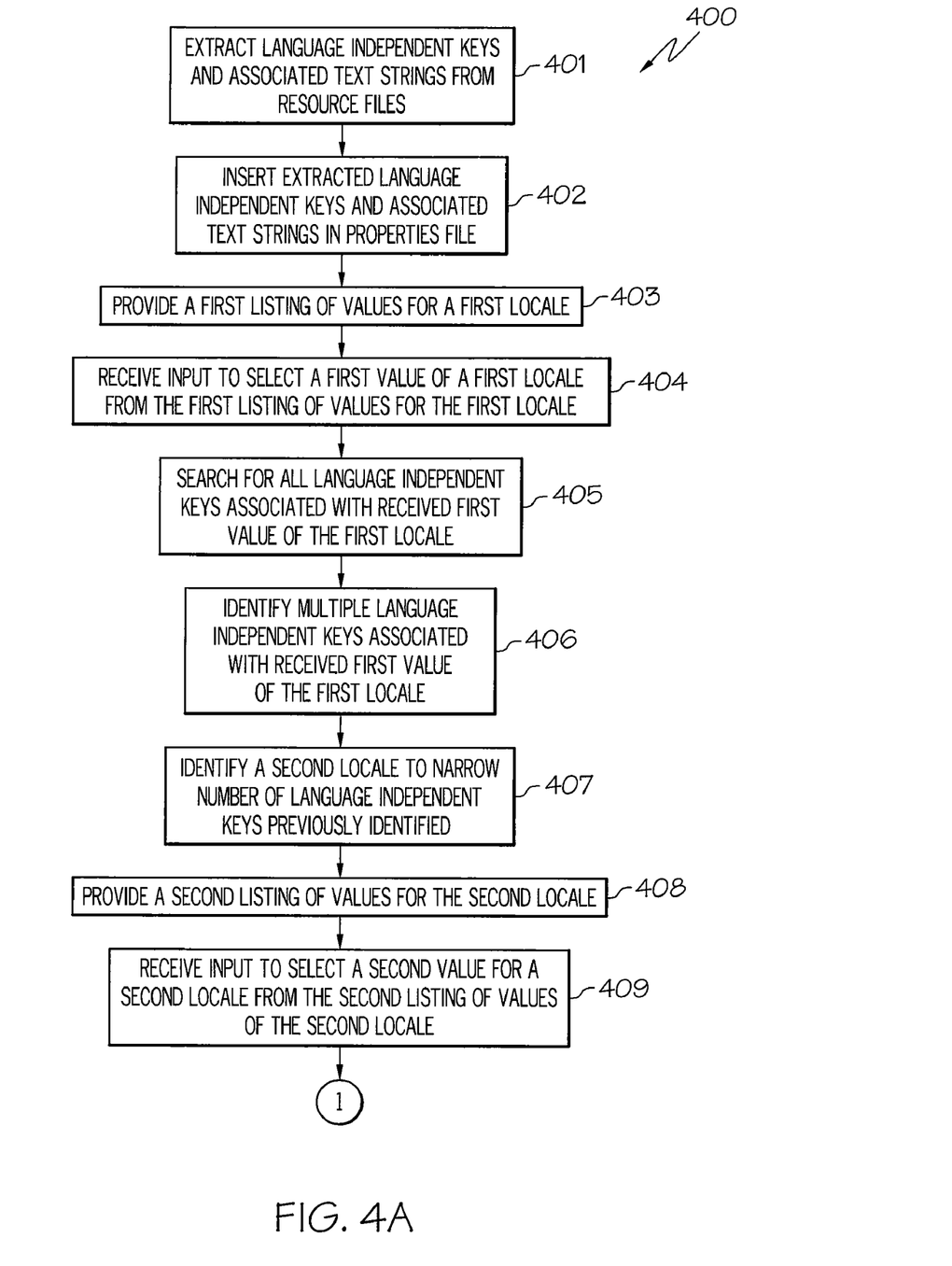
FIGS. 4A-B are a flowchart of a method for automatically identifying unique language independent keys by value and key searches in accordance with an embodiment of the present invention.
Figure 4B:
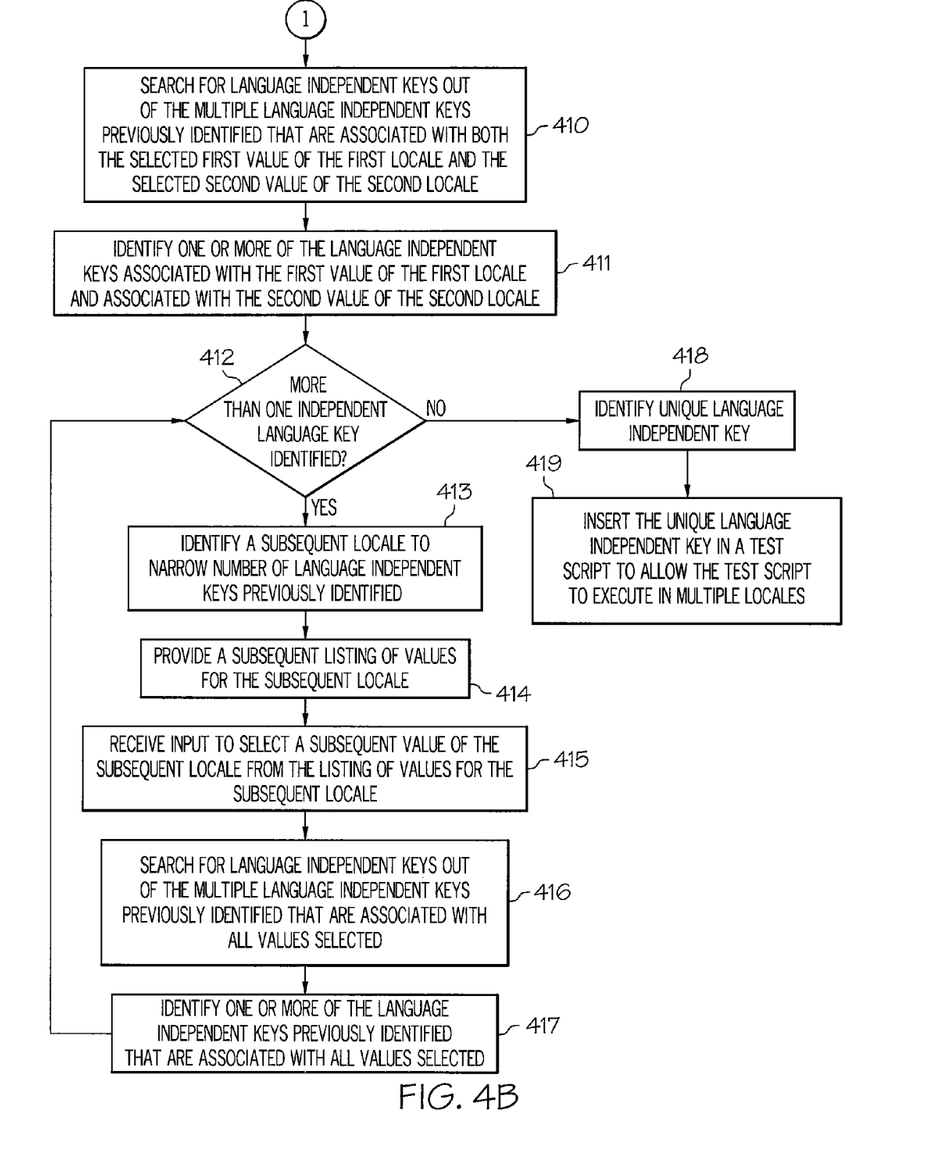
Figure 5A:
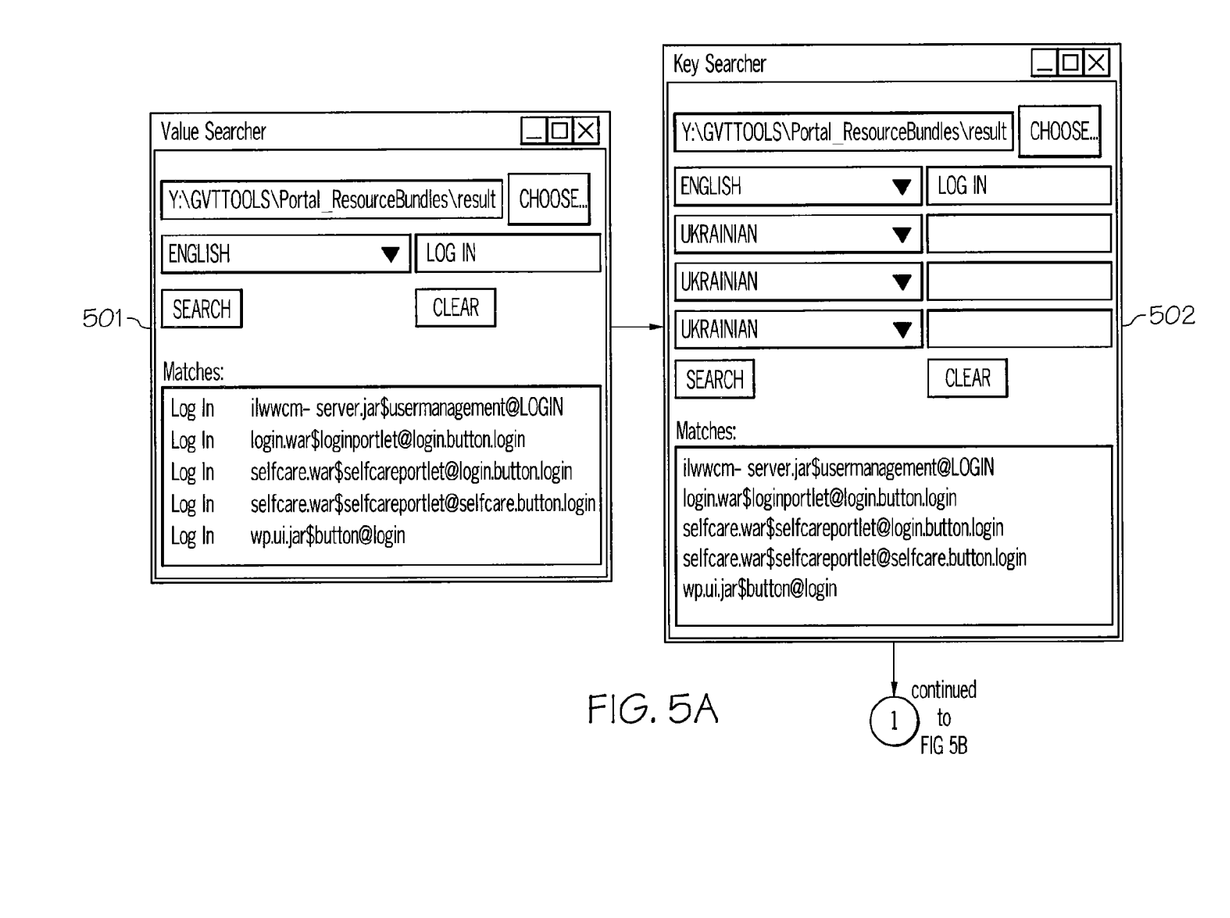
FIGS. 5A-B illustrate screen shots of various stages in the process for automatically identifying unique language independent keys to aid the reader's understanding of the method of FIGS. 4A-B in accordance with an embodiment of the present invention.
Figure 5B:
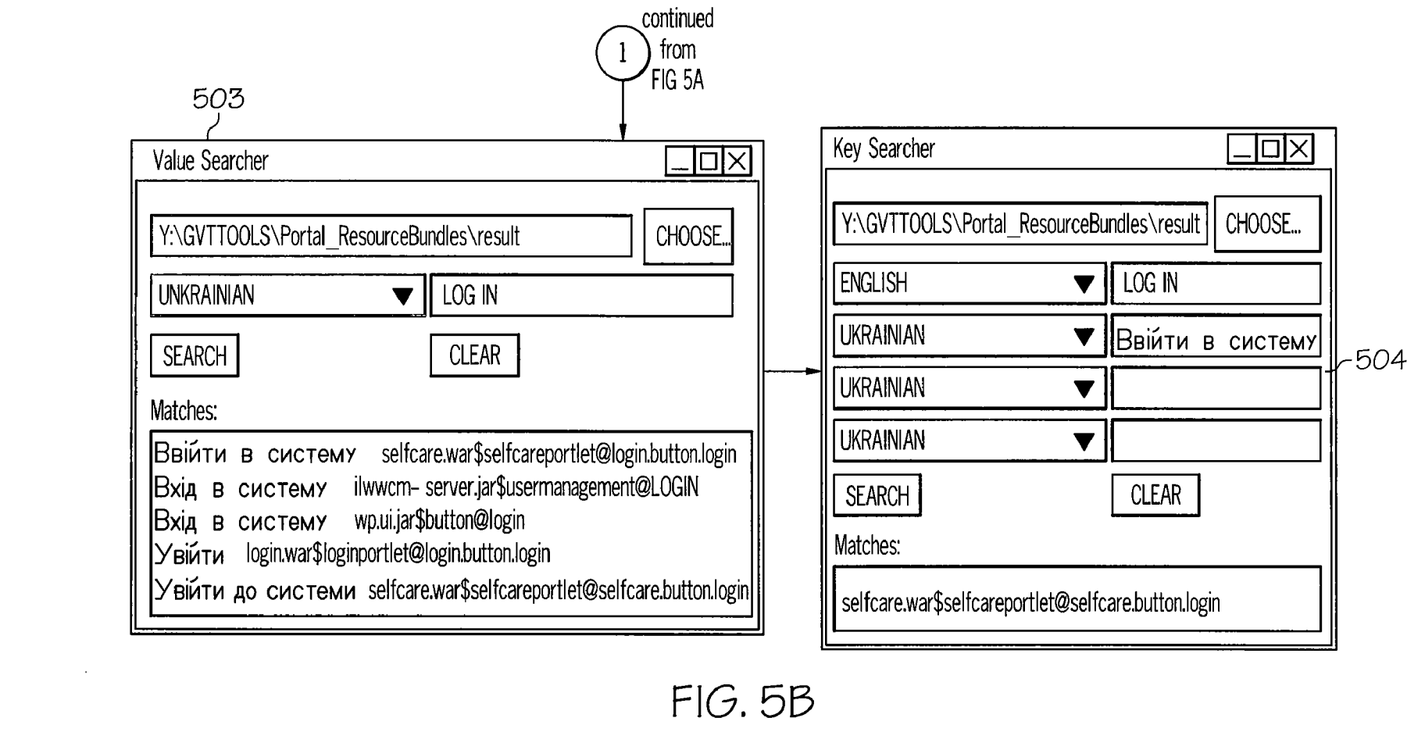

As discussed in the Background Information section, currently, the script writer manually searches through the language independent keys in the properties file to identify the unique language independent keys to use as well as to determine if the associated text strings for the various locales are correct. Having incorrect text strings may be referred to as "translation issues." The script writer may also manually determine if there are any missing text strings in association with the language independent key. This may be referred to as "translatability issues." By manually searching these language independent keys to identify a unique language independent key and determining if there are translation or translatability issues, the process is time-consuming and inefficient. Further, most script writers are not proficient in various foreign languages and do not have the knowledge to identify the correct language independent key or to determine or correct the translation and translatability issues. Therefore, there is a need in the art to aid the script writer by automatically identifying unique language independent keys associated with particular text strings of various locales. The script writer may be aided, at least in part, by automatically identifying unique language independent keys associated with particular text strings of various locales by "value searches" and "key searches" (discussed further below), as discussed herein in connection with FIGS. 4A-B and 5A-B. FIGS. 4A-B are a flowchart of a method for automatically identifying unique language independent keys associated with particular text strings of various locales by value and key searches. FIGS. 5A-B illustrate screen shots of various stages in the process for automatically identifying unique language independent keys to aid the reader's understanding of the method of FIGS. 4A-B.

FIGS. 4A-B—Method for Automatically Identifying Unique Language Independent Keys by Value and Key Searches FIGS. 4A-B are a flowchart of a method 400 for automatically identifying unique language independent keys by value and key searches in accordance with an embodiment of the present invention.

Referring to FIG. 4A, in conjunction with FIG. 3, in step 401, a program of the present invention extracts language independent keys and associated text strings from resource files. Resource files may refer to files that include language independent keys and associated values or text strings across various locales.

In step 402, the program of the present invention inserts the extracted language independent keys and associated text strings in a file, referred to herein as the "properties file."

In step 403, the program of the present invention provides a listing of values (i.e., text strings) for a first locale (e.g., English locale). In step 404, the program of the present invention receives input to select a value (i.e., a text string) for a first locale (e.g., English locale) from the listing of values for the first locale. For example, referring to FIG. 5A, FIG. 5A illustrates a screen shot of a window 501 in the English locale. The user may select a text (e.g., "Log in") from a listing of values (not shown) provided to the user. The listing of values provided to the user may be referred to as performing a "value search." A value search may be important if the user cannot type-in the characters for the term the user desires to search to identify all the language independent keys associated with that term. For example, if the user desires to search for the language independent keys associated with a Japanese term, there may not be Japanese characters on the keyboard for the user to type-in that Japanese term.

Returning to FIG. 4A, in conjunction with FIG. 5A, in step 405, the program of the present invention searches for all language independent keys associated with the selected value for the first locale (e.g., English locale). This may be referred to herein as performing a "key search." In step 406, the program of the present invention identifies multiple language independent keys associated with the received value for the first locale. As illustrated in the screen shot of window 502, multiple language independent keys are identified (e.g., ilw-wcm-server.jar$usermanagement@LOGIN; login.war$loginportlet@login.button.login; selfcare.war$selfcareportlet@login.button.login; selfcare.war$selfcareportlet@selfcare.button.login; wp.ui.jar$button@login) in connection with the text string of "Log in."

In step 407, the program of the present invention identifies a second locale to narrow the number of language independent keys identified in step 406. For example, the program of the present invention may indicate to the user to use the Ukrainian locale to limit the number of language independent keys identified in step 406 as illustrated in the bottom of the screen shot of window 502.

Referring to FIG. 4A, in conjunction with FIG. 5B, in step 408, the program of the present invention provides a second listing of values for the second locale (e.g., Ukrainian locale) that have the same meaning as the first value for the first locale selected in step 404. That is, in step 408, the program of the present invention performs a value search for the values for the second locale that have the same meaning as the first value for the first locale selected in step 404. Referring to FIG. 5B, FIG. 5B illustrates a screen shot of a window 503 in the Ukrainian locale where a listing of values or Ukrainian text strings, equivalent to the value or text string selected in step 404, is provided. Further, in one embodiment, the program of the present invention may also provide the language independent keys associated with the values for the second locale displayed to the user. Referring to FIG. 5B, the screen shot of window 503 further illustrates a listing of the language independent keys associated with the values for the second locale displayed to the user. Further, in one embodiment, the program of the present invention may suggest one of the values listed for the second locale for the user to select in order to narrow the number of language independent keys identified in step 406 (including identifying a unique language independent key), as illustrated by the highlighted term in window 503.

In step 409, the program of the present invention receives input to select a value (i.e., a text string) for a second locale (e.g., Ukrainian locale) from the listing of values displayed for the second locale. For example, referring to the screen shot of windows 503, 504, the user selects one of the Ukrainian text strings that is equivalent to the English word of "Log in."

Referring to FIG. 4B, in conjunction with FIG. 5B, in step 410, the program of the present invention searches (i.e., performs a key search) for language independent keys out of the multiple language independent keys previously identified in step 406 that are associated with both the selected values in steps 404 and 409 (e.g., English term "Log in" and equivalent term in Ukrainian) in the first and second locales (e.g., English and Ukrainian locales). In step 411, the program of the present invention identifies one or more language independent keys associated with both the selected values in steps 404 and 409 in the first and second locales. As illustrated in the screen shot of window 504, the program of the present invention identified a single language independent key (e.g., selfcare.war$selfcareportlet@selfcare.button.login) that is associated with both the selected values in steps 404 and 409 in the first and second locales.

By having the program of the present invention perform value and key searches and suggest a second locale, including providing a listing of values or text strings in the second locale that have the same meaning as the value selected by the user in the first locale (including identifying one of the values in the listing of values for the second locale to select), in order to narrow the number of language independent keys as discussed above, the time in identifying a unique language independent key is reduced and efficiency is improved as the script writer does not have to manually scroll through language independent keys, manually enter values for the various locales, and manually identify a unique language independent key that is associated with the text strings of interest across multiple locales.

Referring to FIG. 4B, in step 412, the program of the present invention determines if more than one independent key is identified in step 411. If there is more than one independent key identified, then, in step 413, the program of the present invention identifies a subsequent locale to narrow the language independent keys previously identified. In step 414, the program of the present invention provides a subsequent listing of values for a subsequent locale (e.g., Thailand locale) that have the same meaning as the values previously selected. That is, in step 414, the program of the present invention performs a value search for the values for a subsequent locale that have the same meaning as the values previously selected by the user.

In step 415, the program of the present invention receives input to select a subsequent value (i.e., a text string) for the subsequent locale (e.g., Thailand locale) from the listing of values displayed for the subsequent locale.

In step 416, the program of the present invention searches (i.e., performs a key search) for language independent keys out of the multiple language independent keys previously identified that are associated with all the values selected by the user. In step 417, the program of the present invention identifies one or more of the language independent keys previously identified that are associated with all the values selected by the user. Upon executing step 417, the program of the present invention, in step 412, determines if more than one independent key is identified.

If, in step 417, the program of the present invention determines that only one independent key is identified, then, in step 418, the program of the present invention has identified the unique language independent key. The unique language independent key may refer to a language independent key that is associated with the same term (e.g., "hello" in English) in various locales (e.g., English, Japanese, Spanish) where each text string of the term in the various locales (e.g., "hello" in English, "hola" in Spanish) is the correct use of the term. In step 419, the program of the present invention inserts the unique language independent key in a test script used for testing internationalized programs that will allow the test script to be executed in multiple locales.

Method 400 may include other and/or additional steps that, for clarity, are not depicted. Further, method 400 may be executed in a different order presented and that the order presented in the discussion of FIGS. 4A-B is illustrative. Additionally, certain steps in method 400 may be executed in a substantially simultaneous manner or may be omitted.

As discussed above, the value search and the key search may be used to identify a unique language independent key in less time than if the script writer had to manually scroll through language independent keys, manually enter values for the various locales, and manually identify a unique language independent key that is associated with the text strings of interest across multiple locales. Additional benefits with using the value search include identifying translatability issues. A translatability issue, referred to herein, includes the scenario of when a text string is hard-coded within a resource file. For example, if a particular value (i.e., text string) is not associated with any language independent key, then this may indicate that the text string is hard-coded.

Figure 6:
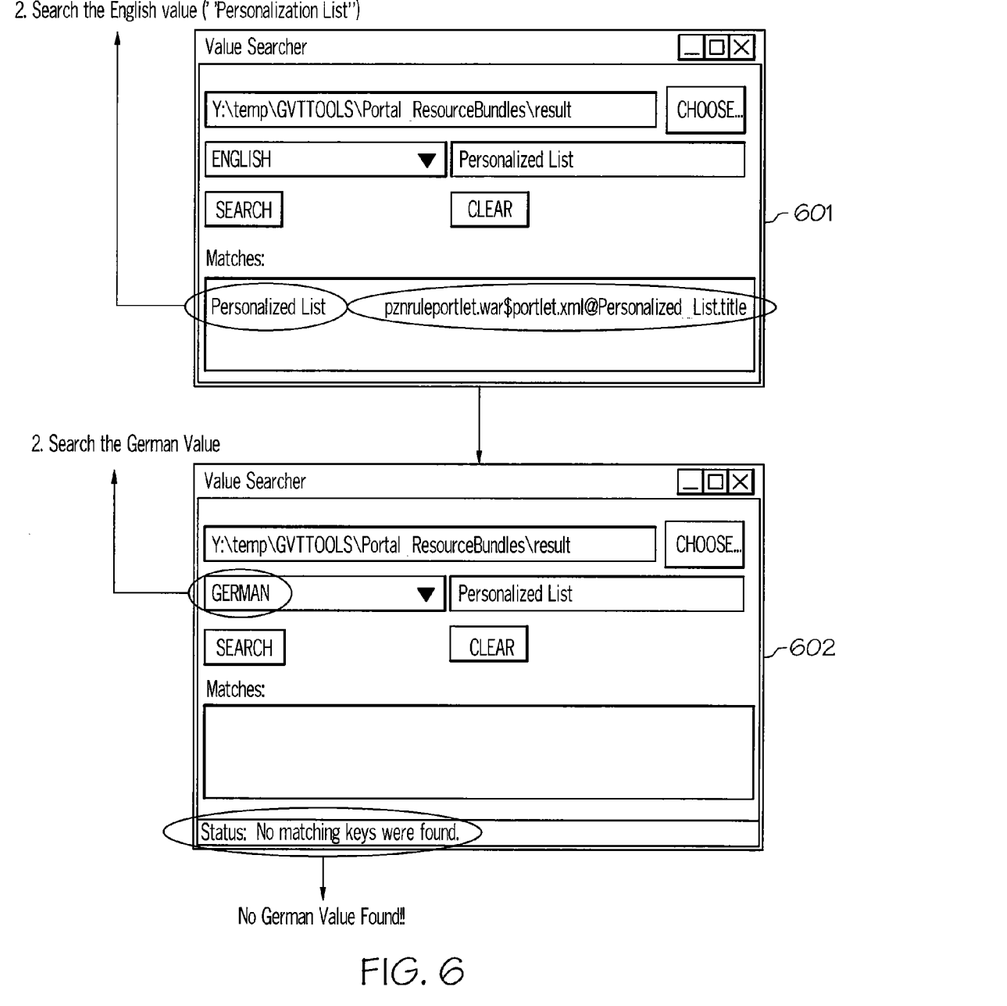
FIG. 6 illustrates screen shots of the process in identifying missing translations in accordance with an embodiment of the present invention.

Another benefit with using the value search is identifying missing translations. For example, if a text string ("hello") in one locale (e.g., English locale) is found with a language independent key, but the same term translated in another language ("hola" in Spanish) is not found with the same language independent key, then a missing translation associated with the language independent key may be found. For example, referring to FIG. 6, FIG. 6 illustrates a screen shot of window 601 illustrating a value search being performed for the value of "Personalized List" in the English locale. FIG. 6 further illustrates a screen shot of window 602 illustrating that the same term translated in German is not found with the language independent key identified in window 601.

Another benefit with using the value search is identifying encoding issues. For example, if a text string ("hello") in one locale (e.g., English locale) is found with a language independent key, and the same term translated in another language is also found with the same language independent key but the value (i.e., text string) in the other language is corrupted (e.g., instead of "hola" in Spanish it is "???" in Spanish), then an encoding issue may be found.

One further benefit with using the value search is identifying translation issues. For example, if a text string (e.g., "hello") in one locale (e.g., English locale) is found with a language independent key, and the same term translated in another language (e.g., Japanese locale) is found with multiple keys associated with multiple values (e.g., "Youkoso," "Kangei," "Konnichiwa"), then a translation issue may have been identified.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for automatically identifying unique language independent keys comprising the steps of:
   extracting language independent keys and associated text strings from resource files;
   inserting said extracted language independent keys and associated text strings in a file;
   providing a first listing of values of a first locale;
   receiving input to select a first value of said first locale from said first listing of values of said first locale;
   searching for language independent keys in said file associated with said first value of said first locale;
   identifying a plurality of language independent keys associated with said first value of said first locale;
   identifying a second locale to narrow a number of said plurality of language independent keys;
   providing a second listing of values of said second locale;
   receiving input to select a second value of said second locale from said second listing of values of said second locale;
   searching for language independent keys out of said plurality of language independent keys that are associated with said first value of said first locale and associated with said second value of said second locale; and
   identifying one or more of said plurality of language independent keys that are associated with said first value of said first locale and associated with said second value of said second locale.

2. The method as recited in claim 1, wherein if only one of said one or more of said plurality of language independent keys is identified, then said one of said one or more of said plurality of language independent keys is a unique language independent key.

3. The method as recited in claim 2 further comprising the step of:
   inserting said unique language independent key in a test script to allow said test script to execute in multiple locales.

4. The method as recited in claim 1, wherein if more than one of said one or more of said plurality of language independent keys is identified, then the method further comprises the step of:
   identifying a third locale.

5. The method as recited in claim 4 further comprising the steps of:
   providing a third listing of values of said third locale;
   receiving input to select a third value of said third locale from said third listing of values of said third locale;
   searching for language independent keys that are associated with said first value of said first locale, said second value of said second locale and said third value of said third locale.

6. The method as recited in claim 1, wherein said first value and said second value are text strings.

7. The method as recited in claim 1 further comprising the step of:
   suggesting one of said second listing of values of said second locale for a user to select in order to identify a unique language independent key.

8. A system, comprising:
   a memory unit for storing a computer program for automatically identifying unique language independent keys; and
   a processor coupled to said memory unit, wherein said processor, responsive to said computer program, comprises:
      circuitry for extracting language independent keys and associated text strings from resource files;
      circuitry for inserting said extracted language independent keys and associated text strings in a file;
      circuitry for providing a first listing of values of a first locale;
      circuitry for receiving input to select a first value of said first locale from said first listing of values of said first locale;
      circuitry for searching for language independent keys in said file associated with said first value of said first locale;
      circuitry for identifying a plurality of language independent keys associated with said first value of said first locale;
      circuitry for identifying a second locale to narrow a number of said plurality of language independent keys;
      circuitry for providing a second listing of values of said second locale;
      circuitry for receiving input to select a second value of said second locale from said second listing of values of said second locale;
      circuitry for searching for language independent keys out of said plurality of language independent keys that are associated with said first value of said first locale and associated with said second value of said second locale; and
      circuitry for identifying one or more of said plurality of language independent keys that are associated with said first value of said first locale and associated with said second value of said second locale.

9. The system as recited in claim 8, wherein if only one of said one or more of said plurality of language independent keys is identified, then said one of said one or more of said plurality of language independent keys is a unique language independent key.

10. The system as recited in claim 9, wherein said processor further comprises:
    circuitry for inserting said unique language independent key in a test script to allow said test script to execute in multiple locales.

11. The system as recited in claim 8, wherein if more than one of said one or more of said plurality of language independent keys is identified, then said processor further comprises:
    circuitry for identifying a third locale.

12. The system as recited in claim 11, wherein said processor further comprises:
    circuitry for providing a third listing of values of said third locale;
    circuitry for receiving input to select a third value of said third locale from said third listing of values of said third locale;
    circuitry for searching for language independent keys that are associated with said first value of said first locale, said second value of said second locale and said third value of said third locale.

13. The system as recited in claim 8, wherein said first value and said second value are text strings.

14. A computer program product embodied in a non-transitory computer readable storage medium for automatically identifying unique language independent keys comprising the programming steps of:
    extracting language independent keys and associated text strings from resource files;
    inserting said extracted language independent keys and associated text strings in a file;
    providing a first listing of values of a first locale;
    receiving input to select a first value of said first locale from said first listing of values of said first locale;
    searching for language independent keys in said file associated with said first value of said first locale;
    identifying a plurality of language independent keys associated with said first value of said first locale;
    identifying a second locale to narrow a number of said plurality of language independent keys;
    providing a second listing of values of said second locale;
    receiving input to select a second value of said second locale from said second listing of values of said second locale;
    searching for language independent keys out of said plurality of language independent keys that are associated with said first value of said first locale and associated with said second value of said second locale; and
    identifying one or more of said plurality of language independent keys that are associated with said first value of said first locale and associated with said second value of said second locale.

15. The computer program product as recited in claim 14, wherein if only one of said one or more of said plurality of language independent keys is identified, then said one of said one or more of said plurality of language independent keys is a unique language independent key.

16. The computer program product as recited in claim 15 further comprising the programming step of:
    inserting said unique language independent key in a test script to allow said test script to execute in multiple locales.

17. The computer program product as recited in claim 14, wherein if more than one of said one or more of said plurality of language independent keys is identified, then the computer program product further comprises the programming step of:
    identifying a third locale.

18. The computer program product as recited in claim 17 further comprising the programming steps of:
    providing a third listing of values of said third locale;
    receiving input to select a third value of said third locale from said third listing of values of said third locale;
    searching for language independent keys that are associated with said first value of said first locale, said second value of said second locale and said third value of said third locale.

19. The computer program product as recited in claim 14, wherein said first value and said second value are text strings.

20. The computer program product as recited in claim 14 further comprising the programming step of:
    suggesting one of said second listing of values of said second locale for a user to select in order to identify a unique language independent key.

\* \* \* \* \*